United States Patent
McKie et al.

(10) Patent No.: US 6,496,268 B1
(45) Date of Patent: Dec. 17, 2002

(54) LASER-BASED GLASS THICKNESS MEASUREMENT SYSTEM AND METHOD

(75) Inventors: Andrew D. W. McKie, Newbury Park, CA (US); Marvin B. Klein, Pacific Palisades, CA (US); Bruno Pouet, Los Angeles, CA (US); Frank Jyh-Herng Shih, Los Angeles, CA (US)

(73) Assignees: Innovative Technology Licensing, LLC, Thousand Oaks, CA (US); Lasson Technologies, Inc., Culver City, CA (US)

( * ) Notice: Subject to any disclaimer, the term of this patent is extended or adjusted under 35 U.S.C. 154(b) by 207 days.

(21) Appl. No.: 09/618,526

(22) Filed: Jul. 18, 2000

(51) Int. Cl.$^7$ .................................................. G01B 9/02
(52) U.S. Cl. ......................................... 356/503; 73/657
(58) Field of Search ................................ 356/502, 503, 356/432; 73/655, 657

(56) References Cited

U.S. PATENT DOCUMENTS 4,659,224 A    4/1987  Monchalin ................... 356/352
6,057,927 A  * 5/2000  Levesque et al. ........... 356/432
6,078,397 A  * 6/2000  Monchalin et al. ......... 356/503

* cited by examiner

Primary Examiner—Samuel A. Turner
Assistant Examiner—Patrick Connolly
(74) Attorney, Agent, or Firm—Koppel, Jacobs, Patrick & Heybl

(57) ABSTRACT

A laser-based technique to determine glass thickness employs a pulsed laser to induce an ultrasonic wave between the surfaces of a region of glass, causing the surfaces to move in and out at a characteristic frequency. The surface motion is monitored to determine the characteristic frequency, which is proportional to the thickness of the glass in the region of the ultrasonic wave. The pulsed laser produces a short duration pulse that illuminates a surface of the glass, which is absorbed within the glass to cause a rapid thermal expansion that generates the ultrasonic wave. The surface motion induced by the ultrasonic wave is preferably detected with a laser interferometer system, the output of which is analyzed to determine the surface motion's characteristic frequency.

28 Claims, 6 Drawing Sheets

LASER-BASED GLASS THICKNESS MEASUREMENT SYSTEM AND METHOD

BACKGROUND OF THE INVENTION

1. Field of the Invention

This invention relates to the field of thickness measurement systems, and particularly to the use of laser ultrasonics to determine glass thickness.

2. Description of the Related Art

To avoid breakage during shipping and handling, the walls of glass products such as bottles and beakers must typically meet a minimum thickness specification. To determine adherence to this specification, the glass thickness must be measured. Glass products of this sort are usually conveyed through a factory in large numbers. To avoid stopping or unduly slowing their movement, such monitoring is preferably performed 'in-line', i.e., as the products travel along the conveyor, and without contacting the glass.

A conventional in-line measurement technique uses a laser system which determines glass thickness using triangulation. A laser beam is directed at the glass to be measured at an oblique angle to the surface. A portion of the beam reflects off the outer surface of the glass, while the remainder of the beam is transmitted through the outer surface; a portion of the transmitted beam is also reflected off the inner surface. The spatial displacement of the two reflected beams is measured, and the thickness of the glass determined from the displacement measurement by a simple geometric calculation.

Unfortunately, as one of the beams must pass back and forth through the glass, this technique works poorly on colored glass, or else requires the use of different laser types for different glass colors. This technique also requires the inner and outer surfaces to be largely parallel, or the accuracy of the technique is lost.

SUMMARY OF THE INVENTION

A system and method for measuring the thickness of glass is presented, which provides in-line, non-contacting thickness measurements regardless of glass color, while avoiding the problems noted above. In addition, the degree of parallelism required is considerably less than that needed in the prior art.

The invention uses a laser-based ultrasound technique to determine glass thickness. An ultrasonic wave is induced between the surfaces of a region of glass. In one operating mode, the ultrasonic wave reflects back and forth between the surfaces repeatedly, building up a reverberation which causes both surfaces of the glass to move in and out at the same characteristic reverberation frequency. The surface motion is monitored to determine the characteristic reverberation frequency, which is inversely proportional to the thickness of the glass in the region of the ultrasonic wave.

In another operating mode, the ultrasonic wave comprises short, discrete pulses which reflect back and forth inside the glass sample. Each time the pulse arrives at a surface, transient surface motion is induced. The pulses (called 'echoes') arrive at equally spaced time intervals. The surface motion is monitored to determine the characteristic 'time-of-flight' (TOF) between successive pulses. The thickness of the glass in the region of the ultrasonic wave is directly proportional to the time-of-flight.

The ultrasonic wave is preferably induced with a pulsed 'generation' laser which produces a short duration pulse that illuminates a surface of the glass. The wavelength of the generation laser is chosen such that the pulse is largely absorbed near the illuminated surface or in the bulk of the material, causing a rapid thermal expansion which results in the creation of the ultrasonic wave. To avoid damaging the glass, the pulse duration, beam size, and energy characteristics of the generation laser must be carefully chosen. The surface motion induced by the ultrasonic wave is preferably detected with an interferometer system which utilizes a separate probe laser. The output of the interferometer is analyzed to determine the TOF or characteristic reverberation frequency of the surface motion.

Because the technique does not require the outputs of the generation or probe lasers to be transmitted through the glass, the glass need not be transparent. Furthermore, since the probe laser need not be reflected off the back surface (as in the prior art), there is no strict requirement that the glass surfaces be parallel; rather, the surfaces need only be sufficiently parallel to allow multiple reflections or reverberations of the ultrasonic wave in a local region. Finally, the present technique requires no contact with the glass, is non-destructive, and is suitable for in-line measurements.

An alternative method of detecting surface motion, useful when the glass is largely transparent with nearly parallel surfaces, utilizes the glass itself as an etalon. The intensity modulation produced by the resulting interference pattern is detected with one or more photocells, with the frequency of the modulation establishing the TOF or characteristic reverberation frequency needed to determine thickness.

Further features and advantages of the invention will be apparent to those skilled in the art from the following detailed description, taken together with the accompanying drawings.

DETAILED DESCRIPTION OF THE INVENTION

Figure 1A:
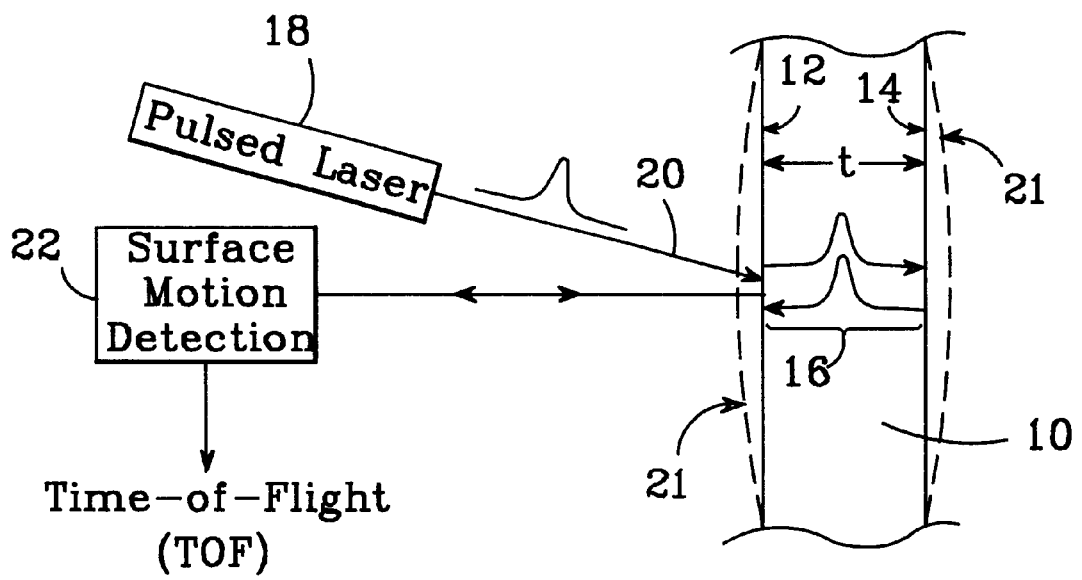
FIG. 1a is a diagram illustrating the basic principles of the invention when short ultrasonic pulses are induced in the glass being measured.

A non-contacting, non-destructive glass thickness measurement system is illustrated in FIG. 1a. A glass region 10 is bounded by surfaces 12 and 14, and has a particular thickness t between the surfaces. Glass region 10 may be part of, for example, a glass container such as a bottle or a beaker, a window pane or windshield, a mirror, or any number of other glass products. The thickness of the glass region is to be determined, typically for quality control purposes: if the wall of a bottle is too thin, for example, the bottle is rejected. As used herein, a glass "region" is a localized segment of a glass structure; the thickness measurement provided by the invention is accurate only in the localized segment.

The thickness of the glass is determined by inducing a transient ultrasonic wave in the glass region, which causes glass surfaces 12 and 14 to move in a characteristic way. If the width of the individual ultrasonic pulses which make up the ultrasonic wavetrain is much shorter than the round trip transit time of a pulse in the glass sample (typically less than one-tenth the round trip transit time), then each surface will move every time an ultrasonic pulse echo arrives at that surface. The motion of one of the glass surfaces is monitored to determine the time between pulse arrivals, referred to herein as the 'time-of-flight' (TOF). The thickness is then calculated from this TOF value. In this 'short-pulse' regime, the ultrasound should be generated near the front surface of the glass sample. In other words, the absorption coefficient of the glass at the generation wavelength must be large.

This process is illustrated in FIG. 1a. An ultrasonic wave 16 is preferably induced in glass region 10 with a pulsed generation laser 18. Laser 18 produces an output beam 20 which is directed to illuminate glass region 10 with a short duration pulse. The characteristics of laser 18 are selected so that its light is absorbed near surface 12 of glass region 10. The absorption of the laser pulse results in a rapid thermal expansion at surface 12, which creates ultrasonic wave 16 within glass region 10.

The ultrasonic wave 16 reflects back and forth between surfaces 12 and 14. Surfaces 12 and 14 will move every time an ultrasonic pulse arrives; this motion is indicated with dashed lines 21. The time between pulse arrivals (TOF) varies with the thickness of the glass in the region in which the wave is propagating. A non-contacting surface motion detection system 22 detects motion 21 and determines the TOF. The thickness t of glass region 10 is determined from the characteristic TOF as follows:

$$t = v * TOF/2 \tag{Eq. 1}$$

where v is the velocity of sound in glass region 10.

The invention relies on the creation of an ultrasonic wave within a glass region. Thus, there is no requirement that any of laser light be transmitted through the glass, and no need for the glass to be transparent. Therefore, the invention is useful with glass of any color.

Figure 1B:
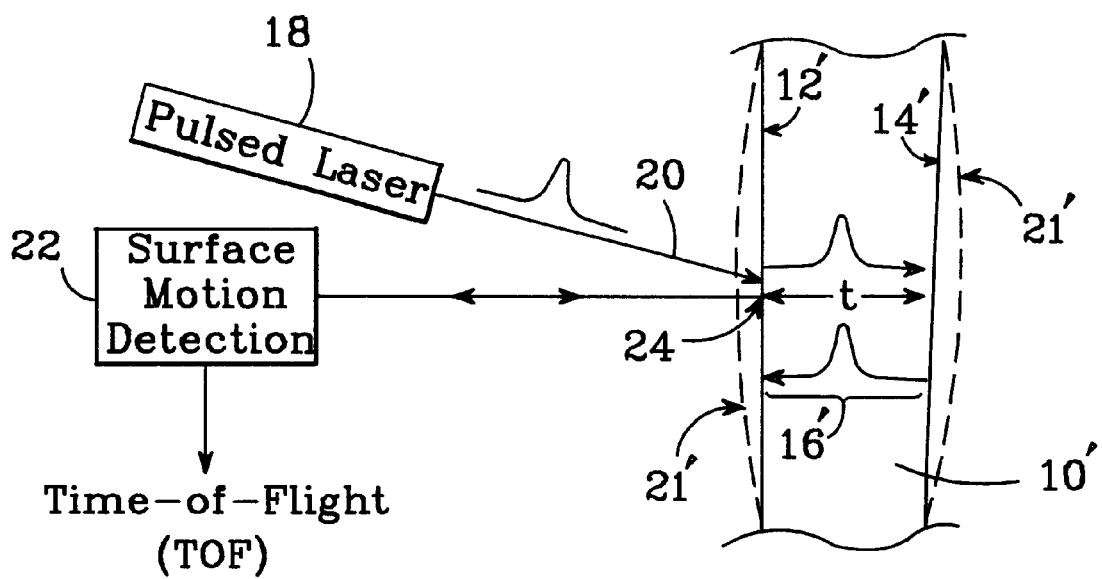
FIG. 1b illustrates the operation of the invention with short ultrasonic pulses and with non-parallel glass surfaces.

Furthermore, because the invention does not rely on the reflection of light from both glass surfaces back to a detector, the parallelism requirement found in the prior art is reduced. This is illustrated in FIG. 1b. Here, a glass region 10' has non-parallel surfaces 12' and 14'. The output beam 20 of pulsed laser 18 is directed at surface 12'. Thermal expansion near surface 12' creates an ultrasonic wave 16' which reflects back and forth between the surfaces, causing the surfaces 12' and 14' to move (21') at the time of pulse arrival. As long as the surfaces are not so askew as to prevent the detection of multiple echoes at a particular point of measurement 24, the TOF can be measured. Surface motion detection system 22 detects motion 21 at point 24, and determines the TOF at that point. This value is proportional to the thickness t of the glass at point 24 in accordance with equation 1 above.

If the pulses making up the ultrasonic wave are longer in time (typically greater than one-tenth the round trip transit time of a pulse in the glass sample), they will couple into a resonant reverberation of the surfaces at a characteristic reverberation frequency f that varies with the region's thickness. For effective coupling into the material resonance, the width of the generated ultrasonic pulse should not exceed one-half of the temporal period of the resonance. This requirement is equivalent to requiring that the spatial extent of the ultrasonic pulse in the region should not exceed the thickness of the region. When pulses meeting this requirement are induced in the glass, the system is said to be operating in the 'long-pulse' regime.

The motion of one of the glass surfaces is monitored to determine the characteristic reverberation frequency, and the thickness calculated from the result. In this long-pulse regime, the ultrasound does not have to be generated near the front surface as is obtained in materials with a high absorption coefficient. The ultrasound could also be generated by absorption throughout the depth of the glass sample, as would be obtained for lower values of absorption coefficient, provided that the absorption is not so low as to transmit most of the optical energy from the generation laser through the rear surface.

Figure 2A:
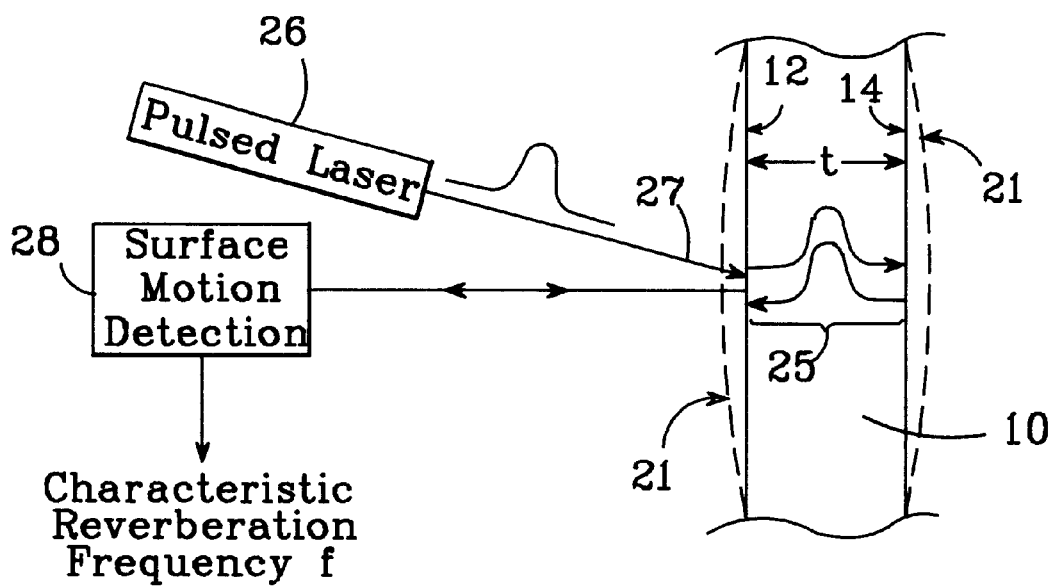
FIG. 2a is a diagram illustrating the basic principles of the invention when longer ultrasonic pulses are induced in the glass being measured.
Figure 2B:
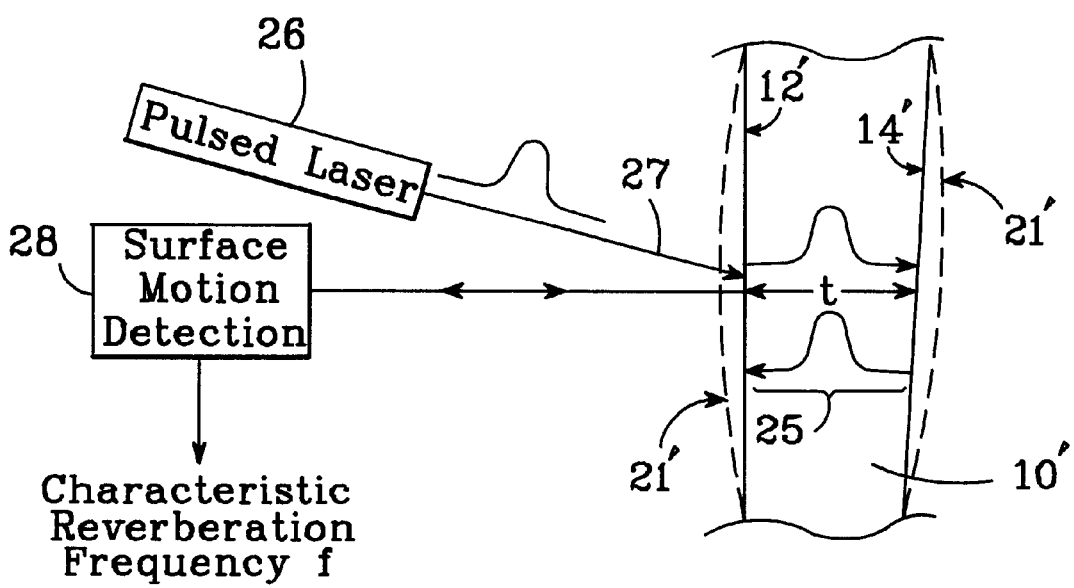
FIG. 2b illustrates the operation of the invention with longer ultrasonic pulses and with non-parallel glass surfaces.

The generation and detection process for longer pulses is illustrated in FIG. 2a. An ultrasonic wave 25 is induced in glass region 10 with a pulsed generation laser 26. Laser 26 produces a pulsed output 27 which is directed to illuminate glass region 10. The absorption of the laser pulse within region 10 results in a rapid thermal expansion which creates ultrasonic wave 25. The pulse width of laser output 27 is selected so that the spatial extent of the generated ultrasonic wave 25 does not exceed the thickness t of the glass region.

The ultrasonic wave 25 reflects back and forth between surfaces 12 and 14, building up a reverberation or resonance that causes the surfaces to move in and out (indicated with dashed lines 21) at characteristic reverberation frequency f, which varies with the thickness of the glass in the region in which the wave is propagating. Non-contacting surface motion detection system 28 detects motion 21 and determines characteristic reverberation frequency f. The thickness t of glass region 10 is determined from the characteristic reverberation frequency f as follows:

$$t = v/2f \tag{Eq. 2}$$

where v is the velocity of sound in glass region 10.

The reduced parallelism requirement discussed in relation to FIG. 1b above is also applicable when operating in the long-pulse regime, as long as surfaces 12' and 14' are not so askew as to prevent reverberation, they will begin to move in and out at the characteristic reverberation frequency. Surface motion detection system 28 detects the motion 21' and determines the characteristic reverberation frequency f, which is proportional to the thickness t of the glass in accordance with equation 2 above.

Note that at the boundary between the short-pulse and long-pulse regimes, there is also an intermediate region of pulse width where distinct temporal echoes are initially observed, with an evolution or conversion to reverberations over a period of time. Operation in this intermediate region is also contemplated, and is discussed in more detail below. Several factors determine which of the regimes the system operates in, including the duration and wavelength of the pulse produced by the pulsed generation laser (discussed below). The thickness of the glass is also a factor, as this will affect whether a given ultrasonic pulse falls into the 'short-pulse', 'long-pulse', or intermediate regimes.

As used herein, the term 'characteristic frequency' refers generally to the determination of either the TOF or the characteristic reverberation frequency of the glass surfaces.

Critical to the proper operation of the invention is the ability to generate an ultrasonic wave within a particular region of glass. This is preferably accomplished with the appropriate selection of the pulsed generation laser used to induce the wave. The laser output's wavelength, duration, beam size, and energy specifications must each be selected to accommodate the measurement of glass thickness.

With respect to wavelength, pulsed generation lasers operating in the visible spectrum would be essentially useless, particularly with clear glass, as their light would be largely transmitted rather than absorbed. However, glass has high absorption characteristics for light in the far infrared portion of the spectrum. Thus, a pulsed generation laser operating in the far infrared is likely to be suitable. For example, a carbon dioxide ($CO_2$) laser which operates with a wavelength of about 10.6 $\mu$m would meet the wavelength criteria in most instances. As noted above, in the short-pulse regime, the generation laser output's wavelength must be chosen to ensure that its light is absorbed near (i.e., within several micrometers) the glass surface, in order to produce a short ultrasonic pulse, while in the long-pulse regime, the wavelength could be chosen so that the laser output is absorbed either near the front surface or in the bulk of the material.

The duration of the generation laser's output pulse must also be carefully chosen. If the pulse is extremely short (i.e. with a width in the picosecond regime), the resulting ultrasonic wave may decay before the TOF can be determined. If the pulse is too long, however, coupling to the reverberations will be inhibited. For samples with thicknesses of a few millimeters, a pulse duration of about 1–100 ns should provide ultrasonic waves having a clearly measurable TOF or characteristic reverberation frequency. Such a pulse duration is provided, for example, by a $CO_2$ laser, which provides pulses of about 90 ns.

For proper operation with glass, the pulsed laser's output beam must be an appropriate size. If the beam size is to large, the pulse's energy is spread out over too large an area, thus reducing the amplitude of the resulting ultrasonic wave and making it more difficult to detect. However, making the beam size too small can result in a local surface temperature which exceeds the damage threshold of the glass, thus discoloring or pitting the glass. In addition, a beam size that is too small can result in the generated ultrasonic pulse walking off or separating from its original point of generation, thereby eliminating the multiple echoes or reverberations required for an accurate measurement of thickness. A $CO_2$ pulsed laser providing a beam diameter of about 5 mm at the glass surface has proven to be satisfactory.

The energy specification of the pulsed laser must also be considered in relation to the damage threshold of the glass. A $CO_2$ laser having an energy rating of about 150 mJ/pulse with a maximum peak power of 1.7 MW has been used on glass regions that are between 0.5 mm and 5 mm thick, without damaging the glass.

Figure 3:
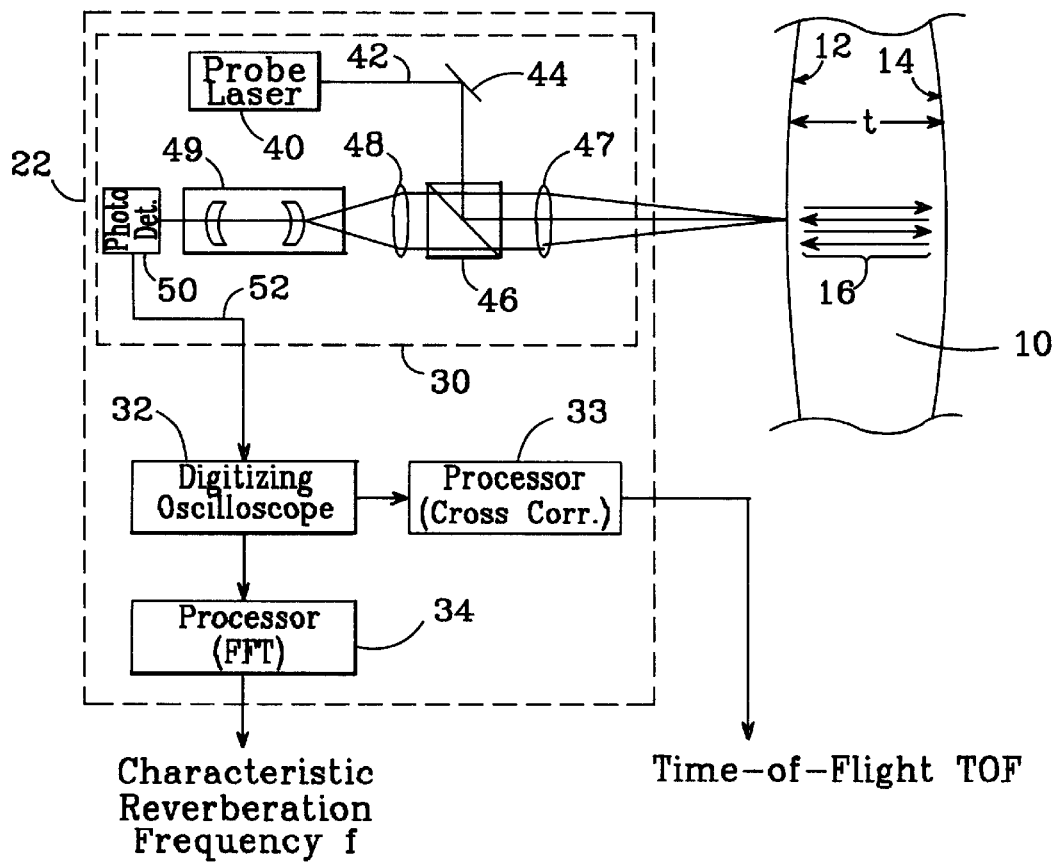
FIG. 3 is a detailed diagram of a surface motion detection system per the present invention.
Figure 3:
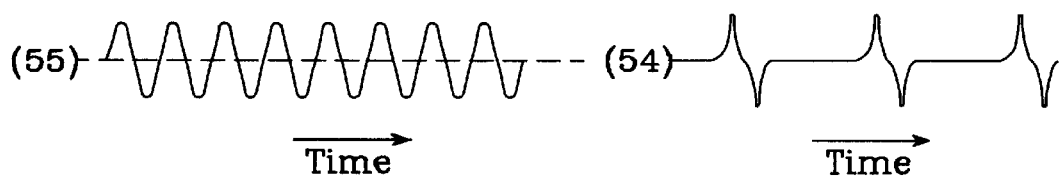
Figure 3:
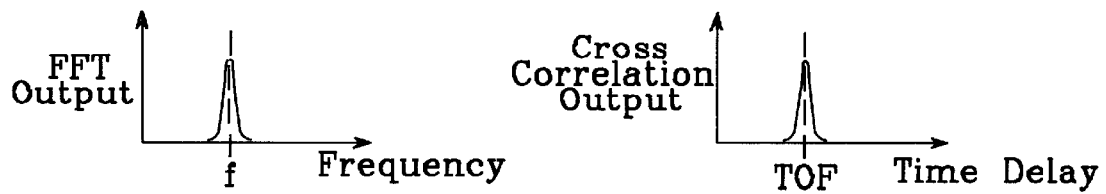

The characteristic frequency of the surface motion produced by the ultrasonic wave is preferably detected without contacting the glass. A transducer mounted on one of the glass surfaces could detect the induced motion, but this approach would be difficult and time-consuming to implement in-line. Thus, a non-contacting surface motion detection system 22 such as that shown in FIG. 3 is preferred. System 22 includes a laser receiver system 30 which detects the surface motion, a digitizing oscilloscope 32 which captures the receiver'soutput, and processors 33 and 34 which determine the TOF and/or characteristic reverberation frequency based on the captured output.

A number of receiver types could be employed to detect surface motion. One preferred system is a laser receiver which includes a confocal Fabry-Pérot interferometer. A simplified version of such a receiver is shown in FIG. 3; additional details can be found, for example, in U.S. Pat. No. 4,659,224 to Monchalin. Recevier 30 includes a probe laser 40, which may have a variable output frequency. Laser 40 produces an output beam 42 which is reflected from a mirror 44 to a polarizing beam splitter 46. A portion of beam 42 is projected onto surface 12 of glass region 10, which is moving due to the presence of ultrasonic wave 16. The incident beam is scattered by surface 12, and due to the Doppler effect caused by the vibrating surface, the scattered beam is frequency modulated. The frequency modulated beam passes through a collection lens 47, beam splitter 46, and lens 48 to a confocal Fabry-Pérot interferometer 49, the output of which is focused on a photodetector 50.

Photodetector 50 produces an output 52. When operating in the short-pulse regime, photodetector output 52 consists of a series of pulses (output trace 54) which result from the echoes of the ultrasonic wave within glass region 10. The spacing between pulses 54 is proportional to twice the thickness (i.e., 2t) of glass region 10, as given in equation 1. The photodetector output 52 is captured with digitizing oscilloscope 32, and processor 33 acquires the ultrasonic waveform from the oscilloscope. To best measure the TOF, the waveform is preferably processed with a cross correlation algorithm. The cross correlator output is shown in FIG. 3. The output is analayzed to determine the TOF between adjacent pulses.

When operating in the long-pulse regime, photodetector output 52 consists of an approximately sinusoidal waveform 55 which results from the coherent motion of glass surfaces 12 and 14 within glass region 10. The period of the waveform is proportional to twice the thickness (i.e., 2t) of glass region 10, as given in equation 2. The photodetector output 52 is captured with digitizing oscilloscope 32, and processor 34 acquires the ultrasonic waveform from the oscilloscope. To best discern the characteristic reverberation frequency based on waveform 55, the waveform is preferably processed with a fast Fourier transform (FFT) algorithm. The FFT output is shown in FIG. 3. The FFT output is analyzed to determine the frequency having the highest peak amplitude. This frequency is characteristic reverberation frequency f.

When using a generation laser which induces a pulse of intermediate width (between the short-pulse and long-pulse regimes), distinct temporal echoes are initially observed, with an evolution or conversion to reverberations over a period of time. In this case, it may be necessary to employ both of processors 33 and 34, to accurately determine TOF and characteristic reverberation frequency, respectively.

A satisfactory surface motion detection system 22 as described above uses an argon-ion laser for probe laser 40, having a focused spot diameter of less than 0.5 mm and an unfocused spot diameter of about 5 mm. Damage to the glass due to probe laser 40 is of little concern, as the continuous wave power directed on glass region 10 by probe laser 40 is much lower than that provided by pulsed generation lasers 18 or 26. Note that the surface motion detection system shown in FIG. 3 is merely one possible embodiment of a surface detection system in accordance with the present invention; adaptive photorefractive interferometers and other systems might also be employed to detect surface motion. In addition, it is not essential that a digitizing oscilloscope and a processor be used to determine the characteristic frequency; many other instrumentation arrangements could be employed to determine this frequency based on the interferometer output.

Figure 4:
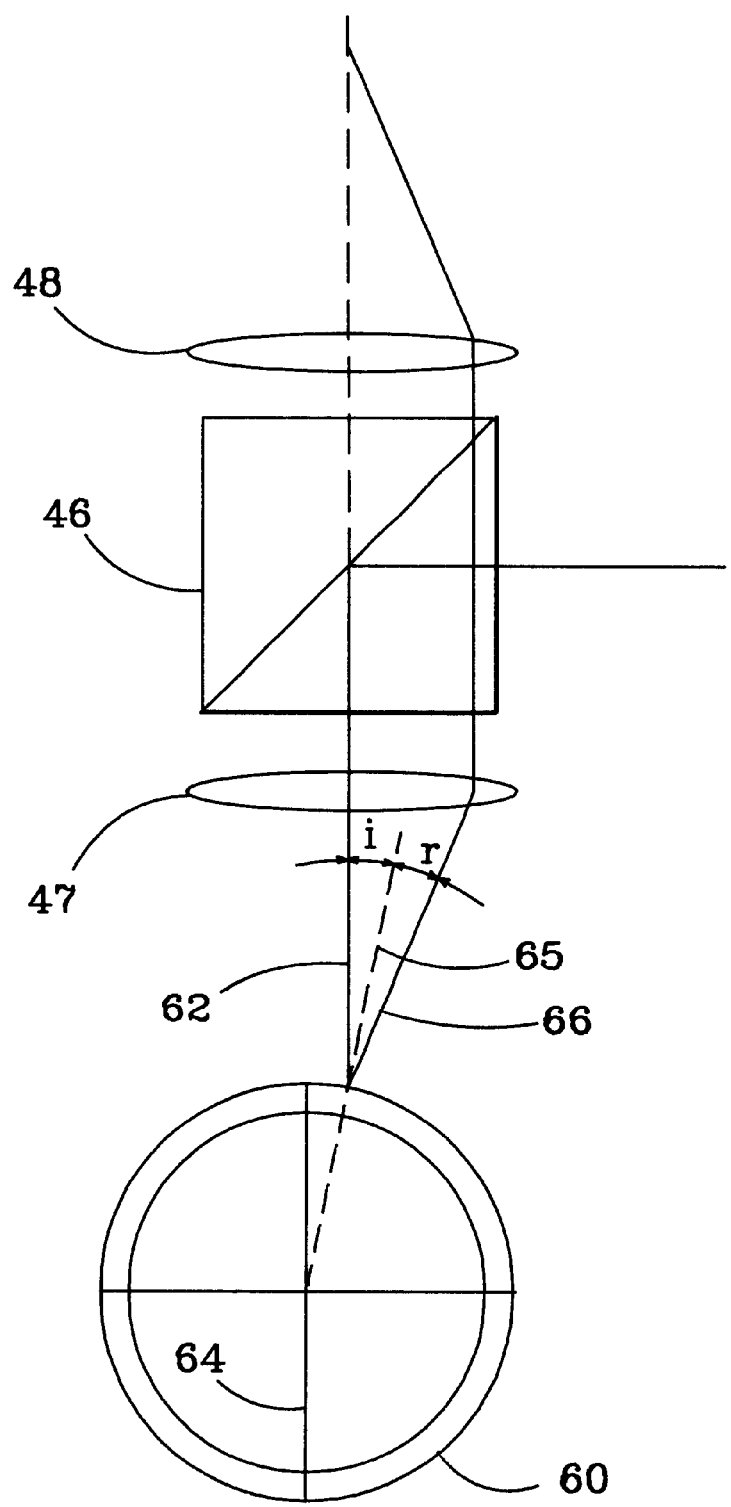
FIG. 4 illustrates an angle of incidence consideration for a surface motion detection system per the present invention.

In some instances, care must be taken to ensure that light reflected from the glass surface is detected by the surface motion detection system 22. For example, if glass region 10 is a portion of a round bottle, the curvature of the bottle may cause the incident light to be reflected at such an angle as to be unreceivable by the detection system. This is illustrated in FIG. 4. The glass being tested is a portion of a glass bottle 60, shown in plan view. Receiver system 30 (not shown except for beam splitter 46, collection lens 47, and lens 48) directs an incident beam 62 onto the glass. In this example, incident beam 62 is offset slightly from the center of the bottle (axis 64), so that there is a non-zero angle of incidence i (i.e., the angle between the incident beam and a line 65 normal to the glass surface where illuminated by the incident beam). This results in the reflected beam 66 having a non-zero angle of reflection r, which is equal to angle i. If angle i is too large, reflected beam 66 will miss collection lens 47, making the characteristic frequency difficult or impossible to determine.

Typically, there are a range of angles of incidence over which the system can effectively collect light reflected from the glass. This range depends on the curvature of the glass, the distance between the collection lens and the glass, and the diameter of the collection lens. However, an angle of incidence equal to zero is likely to produce the best performance, and is preferred.

Figure 5:
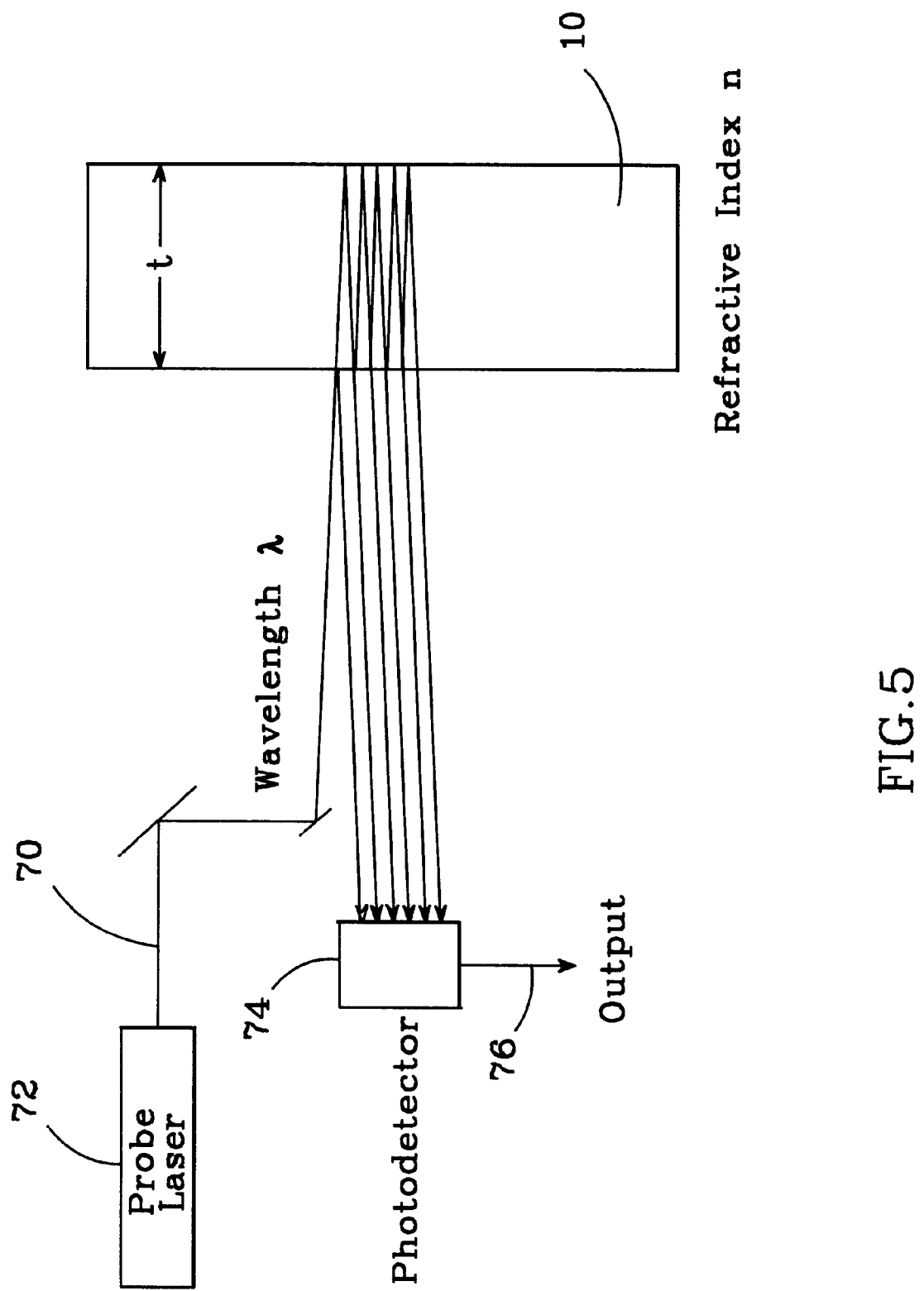
FIG. 5 is a diagram of an alternative surface motion detection system per the present invention, in which the glass being measured serves as an etalon.

Another possible implementation of surface motion detection system 22 is illustrated in FIG. 5. In this approach, no external interferometer is required. Rather, multiple reflections of a probe laser beam inside the glass provide the required interferometric capability. In effect, the glass sample serves as an etalon. This approach is only effective on samples that are substantially transparent and which have parallel or nearly parallel surfaces. As shown in FIG. 5, the output 70 of a probe laser 72 is directed onto glass region 10, which makes multiple reflections in the sample. Each time a beam is incident on the near surface, a portion of the beam is transmitted through the surface toward a photodetector 74. If the probe beam is incident at normal incidence and the surfaces are parallel, then a single bright fringe (corresponding to constructive interference among all the reflected beams) will be observed in reflection when the thickness t is equal to $(2m+1)(\lambda/4n)$, where m is an integer, $\lambda$ is the wavelength of the probe laser and n is the region's index of refraction at wavelength $\lambda$. The intensity of the collected beam varies as the thickness changes with time in response to the ultrasonic wave in the sample. This intensity variation modulates the output 76 of photodetector 74, which is processed to determined characteristic frequency. A preferred bias condition (before the start of a measurement) is $t=(2m+1)(\lambda/8n)$. In this case, the intensity of the bright fringe is ½ of the maximum. This bias condition insures that the etalon response will be linear for small variations (much less than $\lambda/2n$) of the sample thickness. Note that the beams in FIG. 5 are shown thin for simplicity. For glass region 10 to serve as an etalon, the width of input beam 70 must be greater than the "walkoff" shown in the figure.

Figure 6:
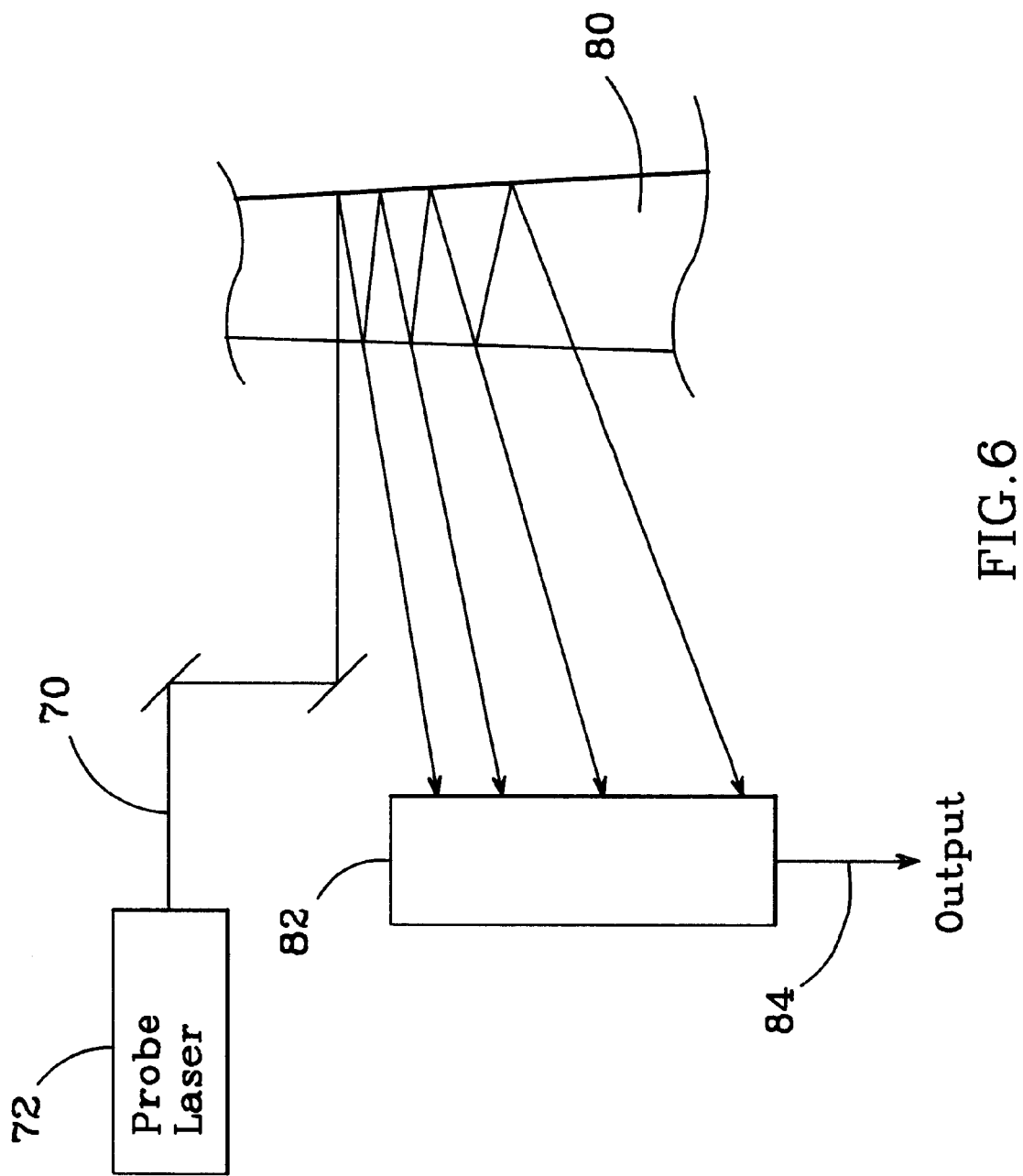

For samples with nonparallel or curved surfaces, the same etalon effect can be used, but now the image formed onto a photodetector will consist of a set of interference fringes. In this situation, it is necessary to aperture the beam at the photodetector to collect only a single fringe. In the inspection of parts whose surface profile is not known in advance, a means of locating and sizing this aperture is required. One means of accomplishing this is illustrated in FIG. 6: probe laser output 70 is directed onto a glass region 80 having non-parallel surfaces, and the resulting set of interference fringes are imaged onto a two-dimensional detector array 82. The array output 84 is processed to locate a suitable fringe, and then the temporal output from one or more elements in the array would be used for later processing to determine characteristic frequency. As in FIG. 5, the beams in FIG. 6 are shown thin for simplicity. For glass region 80 to serve as an etalon, the width of input beam 70 must be greater than the "walkoff" shown in the figure.

While particular embodiments of the invention have been shown and described, numerous variations and alternate embodiments will occur to those skilled in the art. Accordingly, it is intended that the invention be limited only in terms of the appended claims.

We claim:

1. A laser-based glass thickness measurement system, comprising:
   a pulsed generation laser having an output beam capable of producing an ultrasonic wave in a region of glass illuminated by said beam which induces the glass surfaces in said region to move at a characteristic resonant frequency that varies with the thickness of said glass in said region, and
   a non-contacting surface motion detection system arranged to detect the motion of said glass surfaces and determine said characteristic resonant frequency, said characteristic resonant frequency given by the frequency f of the reverberation induced between said surfaces by said wave, the thickness t of said glass in said region given by:

$t=v/2f$ where v is the velocity of sound in said glass.

2. The glass thickness measurement system of claim 1, wherein said pulsed generation laser is arranged such that said ultrasonic wave comprises pulses having a duration which is between about one-tenth and one-half the time required for one of said pulses to traverse said thickness twice.

3. The glass thickness measurement system of claim 1, wherein said pulsed generation laser is further arranged such that its output beam is absorbed within the bulk of said glass region.

4. The glass thickness measurement system of claim 1, wherein said non-contacting surface motion detection system comprises an interferometer arranged to detect said surface motion, a digitizing oscilloscope which receives the output of said interferometer, and a processor programmed to apply a fast Fourier transform (FFT) algorithm to the oscilloscope waveform to determine said frequency f.

5. The glass thickness measurement system of claim 1, wherein said pulsed generation laser is arranged such that said output beam has a wavelength of about 10.6 $\mu$m.

6. The glass thickness measurement system of claim 1, wherein said pulsed generation laser is a carbon dioxide ($CO_2$) laser.

7. The glass thickness measurement system of claim 1, wherein said pulsed generation laser provides an output beam pulse having a duration of 1–100 ns.

8. The glass thickness measurement system of claim 1, wherein said glass has an associated maximum local surface temperature which, when exceeded, results in damage to the glass, said pulsed generation laser arranged to provide an output beam having an energy sufficiently low and a diameter sufficiently large to avoid said local surface temperature from being exceeded.

9. The glass thickness measurement system of claim 8, wherein said pulsed generation laser is arranged to provide an output beam having a diameter of about 5 mm in the area illuminated by said beam.

10. The glass thickness measurement system of claim 1, wherein said surface motion detection system includes an interferometer.

11. The glass thickness measurement system of claim 10, wherein said surface motion detection system comprises a laser receiver which includes a confocal Fabry-Pérot interferometer.

12. The glass thickness measurement system of claim 10, wherein said surface motion detection system comprises a laser receiver which includes an adaptive photorefractive interferometer.

13. The glass thickness measurement system of claim 1, wherein said non-contacting surface motion detection system comprises:
  a probe laser arranged to illuminate said glass region such that constructive interference occurs within said glass region due to said probe laser's output, and
  a photodetector arranged to detect an interference fringe which results from said constructive interference, the intensity of said fringe varying with said thickness such that said photodetector output is modulated by said surface motion.

14. The glass thickness measurement system of claim 1, wherein said non-contacting surface motion detection system comprises:
  a probe laser arranged to illuminate said glass region such that constructive interference occurs within said glass region due to said probe laser's output, and
  an array of photodetectors arranged to detect a set of interference fringes which result from said constructive interference, the intensity of said fringes varying with said thickness such that said photodetector outputs are modulated by said surface motion.

15. A laser-based glass thickness measurement system, comprising:
  a glass object having a region bounded by first and second surfaces,
  a pulsed generation laser which produces an output pulse that is absorbed within said region, said pulse producing an ultrasonic wave in said region which induces said first and second surfaces to move at a characteristic resonant frequency that varies with the thickness of said glass in said region,
  said characteristic resonant frequency given by the frequency f of the reverberation induced between said surfaces by said wave, the thickness t of said glass in said region given by:

$t=v/2f$ where v i s the velocity of sound in said glass, and
  a non-contacting surface motion detection system comprising:
    an interferometer arranged to detect the motion of at least one of said glass surfaces and to produce an output which varies with said detected motion, and
    instrumentation connected to receive said interferometer output and arranged to determine the characteristic resonant frequency of said detected motion based on said interferometer output.

16. The glass thickness measurement system of claim 15, wherein said pulsed generation laser is arranged such that said ultrasonic wave comprises pulses having a duration which is between about one-tenth and one-half the time required for one of said pulses to traverse said thickness twice.

17. The glass thickness measurement system of claim 15, wherein said instrumentation comprises a digitizing oscilloscope which receives the output of said interferometer, and a processor programmed to apply a fast Fourier transform (FFT) algorithm to the oscilloscope waveform to determine said frequency f.

18. A method of determining the thickness of a region of glass, comprising the steps of:
  illuminating a region of glass with the output beam of a pulsed generation laser such that an ultrasonic wave is induced within said region of glass which causes the surfaces of said glass in said region to move at a characteristic resonant frequency, said characteristic resonant frequency given by the frequency f of the reverberation induced between said surfaces by said wave, the thickness t of said glass in said region given by:

$t=v/2f$ where v is the velocity of sound in said glass, and
  determining said characteristic frequency.

19. The method of claim 18, wherein the characteristics of said output beam are such that said ultrasonic wave comprises pulses having a duration which is between about one-tenth and one-half the time required for one of said pulses to traverse said thickness twice.

20. The method of claim 18, wherein determining said characteristic resonant frequency comprises detecting said surface motion, generating a waveform based on said detected motion, and applying a fast Fourier transform to said waveform to determine said reverberation frequency f.

21. The method of claim 18, wherein said output beam has a wavelength of about 10.6 $\mu$m.

22. The method of claim 18, wherein said pulsed generation laser is a carbon dioxide ($CO_2$) laser.

23. The method of claim 18, wherein said pulsed generation laser produces an output beam having a pulse with a duration of 1–100 ns.

24. The method of claim 18, wherein said glass has an associated maximum local surface temperature which, when exceeded, results in damage to the glass, said pulsed generation laser producing an output beam having an energy sufficiently low and a diameter sufficiently large to avoid said local surface temperature from being exceeded.

25. The method of claim 18, wherein said output beam has a diameter of about 5 mm in the region illuminated by said beam to avoid damaging said glass.

26. The method of claim 18, wherein determining said characteristic frequency comprises:
  illuminating said glass region with a probe laser such that constructive interference occurs within said glass region due to said probe laser's output, and
  detecting an interference fringe which results from said constructive interference, the intensity of said fringe varying with said thickness, and
  determining the rate at which said intensity varies, said rate being said characteristic frequency.

27. The method of claim 26, wherein said interference fringe is detected with a photodetector.

28. The method of claim 26, wherein said interference fringe is detected with an array of photodetectors.

* * * * *